Feb. 9, 1932.                L. H. KAUPKE                1,844,255
                              ROTARY HOE
                          Filed June 28, 1929          2 Sheets-Sheet 1
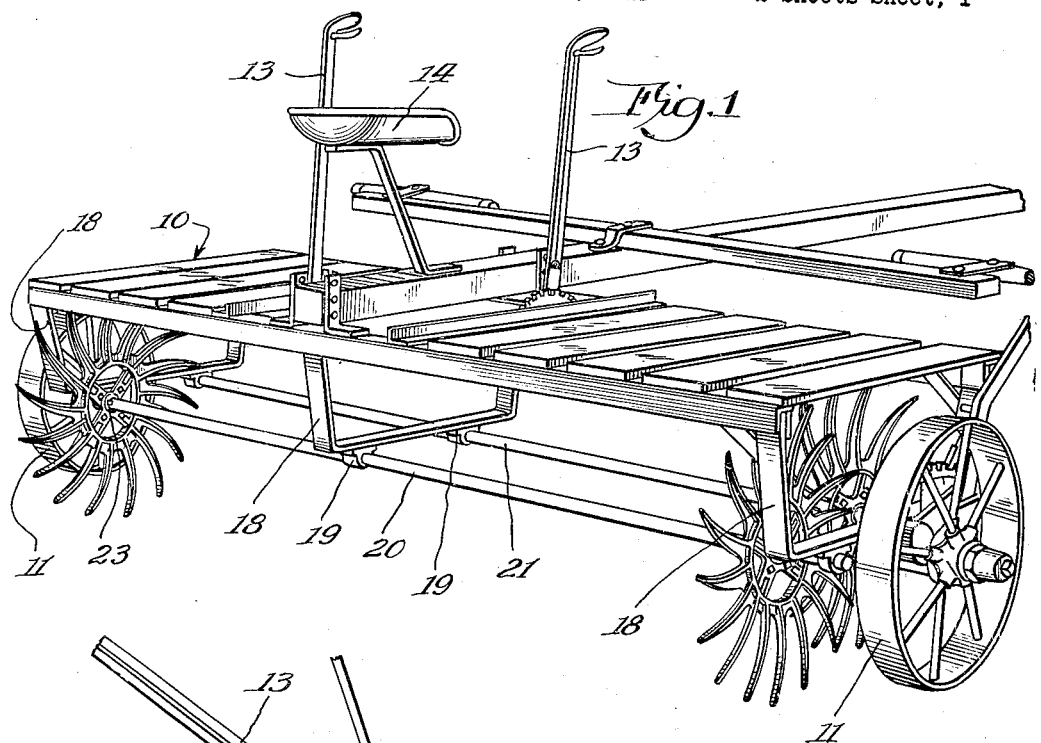
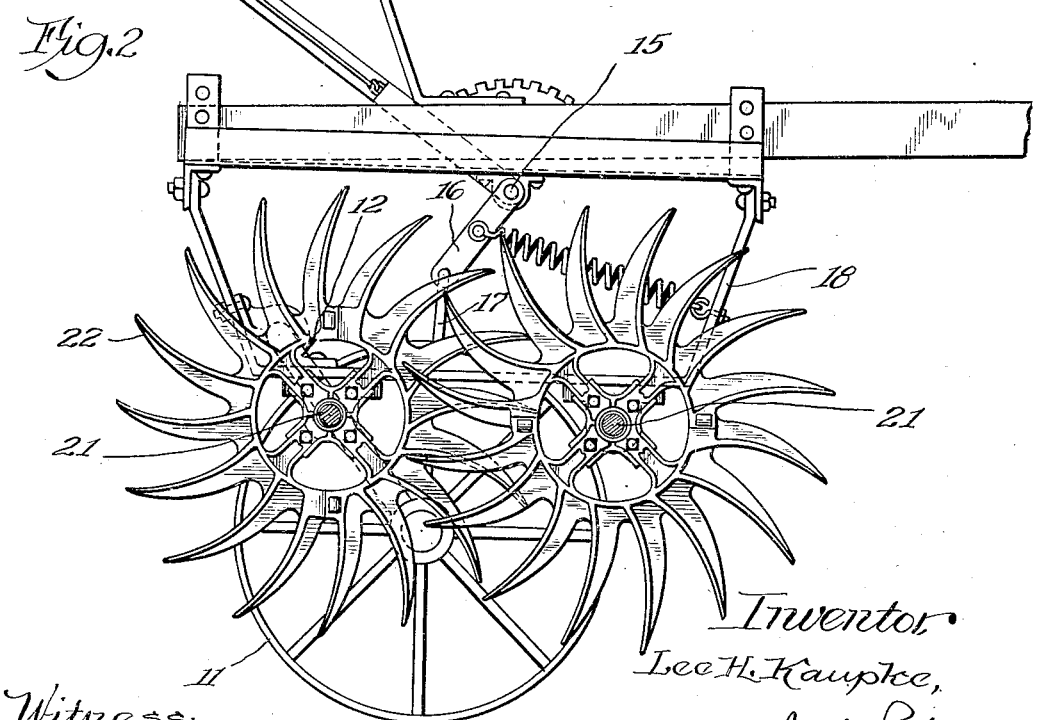

Feb. 9, 1932. L. H. KAUPKE 1,844,255
ROTARY HOE
Filed June 28, 1929 2 Sheets-Sheet 2
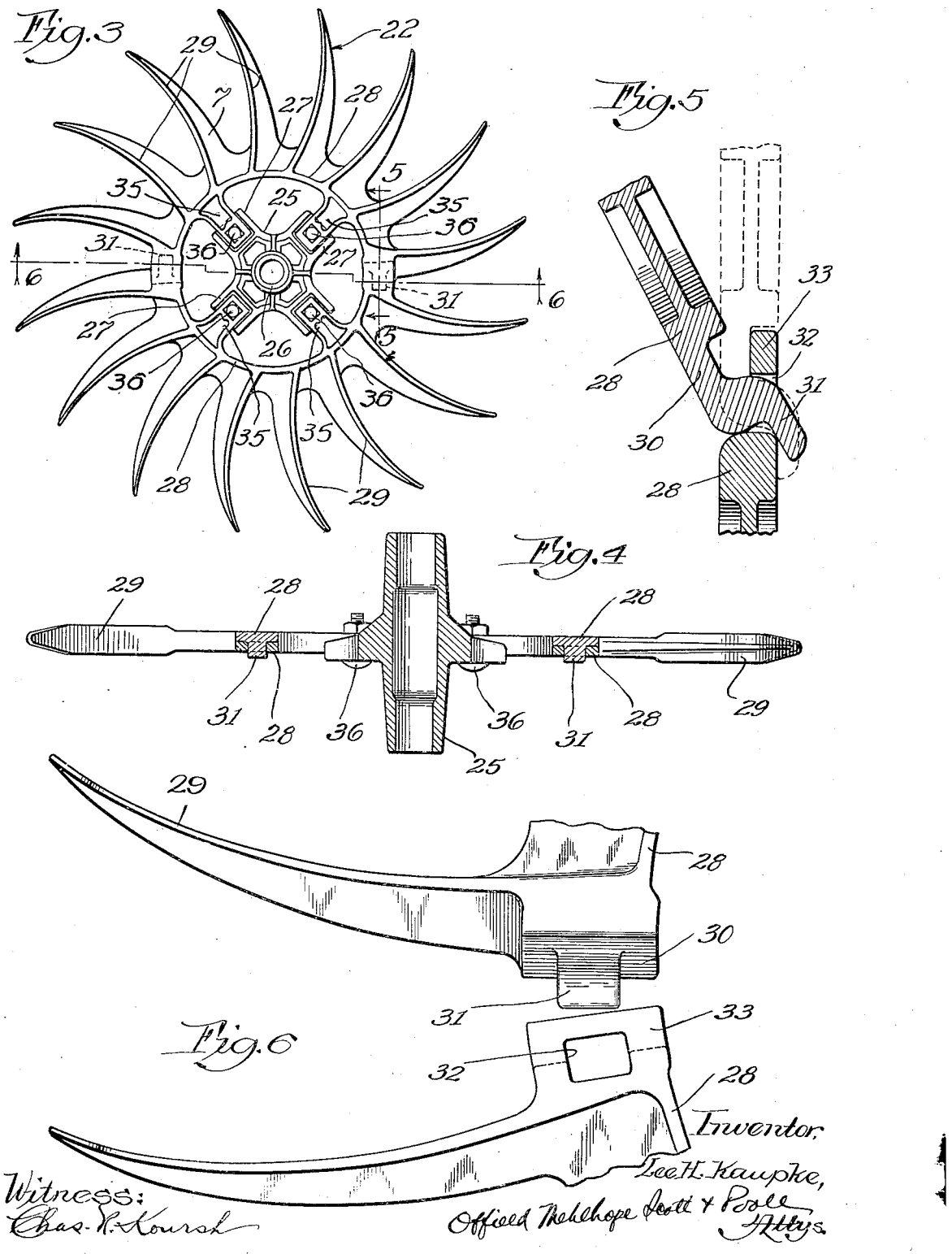

Patented Feb. 9, 1932

1,844,255

UNITED STATES PATENT OFFICE

LEE H. KAUPKE, OF ROCK ISLAND, ILLINOIS, ASSIGNOR TO ROCK ISLAND PLOW COMPANY, OF ROCK ISLAND, ILLINOIS, A CORPORATION OF ILLINOIS

ROTARY HOE

Application filed June 28, 1929. Serial No. 374,540.

This invention relates to improvements in rotary hoes and has for its principal object to provide an improved construction of hoe elements whereby each of said elements may be taken from or replaced on the hoe shaft without disturbing the remaining elements thereon.

A further object is to provide an improved form of hoe element made in two parts detachably connectible to a central hub, which construction is more economical to manufacture than the single cast element heretofore employed in implements of the character described.

The invention may best be understood by reference to the accompanying drawings, in which Figure 1 is a rear view in perspective of a rotary hoe constructed in accordance with my invention, but with most of the hoe elements removed from the supporting shafts intermediate the ends thereof.

Figure 2 is an enlarged section of the implement shown in Figure 1, taken transversely of the hoe shaft.

Figure 3 is an enlarged detail of one of the hoe elements.

Figure 4 is an enlarged detail taken on line 6—6 of Figure 3.

Figure 5 is an enlarged detail taken on line 5—5 of Figure 3.

Figure 6 is a detail illustrating the method of applying two halves of the hoe elements into interlocking engagement with each other.

Referring now to details of the embodiment of my invention illustrated in the drawings, the same is shown as applied to an implement having as its main elements a frame 10 and supporting wheels 11 mounted on crank axles 12 in the usual manner so as to lift or lower the implement to any desired position relative to the ground. The adjustment of the crank axles may be controlled by any suitable means, such as a pair of levers 13—13 arranged on opposite sides of seat 14 and each connected to one of the crank axles through a shaft 15, lever arm 16 and connecting link 17, as best shown in Figures 1 and 2.

The main frame 10 is provided with a plurality of depending brackets 18—18 carrying suitable bearings 19 for the hoe shafts 20 and 21. In the form shown, three such bearing brackets are provided. Each shaft carries a plurality of hoe elements 22—22, said hoe elements, however, being arranged in staggered relation on their respective shafts, as indicated in Figures 1 and 2. The hoe elements are preferably mounted loosely on their respective shafts, excepting that at least one of said elements is keyed to its respective shaft, as for instance indicated at 23 in Figure 1, this arrangement being to insure rotation of the shafts in their bearings 19—19 so as to minimize frictional wear of the remaining hoe elements on their shafts, although permitting freedom of rotation of each element, as is desirable in implements of this character.

Referring now more particularly to my improved construction for the separate hoe elements, reference to Figure 3 will show that each of said elements comprises a center spider 25 including a hub 26 and a plurality of radial projections 27—27, herein four in number. The remaining portions of the elements are made up of two similar semi-circular castings 28—28 each forming half of a circular ring-like piece, provided with a plurality of outwardly extending curved projections or hoe teeth 29 of the usual form, adapted to engage the ground.

Each of the semi-circular members 28—28 is provided with a pair of interlocking connections for detachable engagement with another similar part, in the form shown, each connection comprising a part 30 reduced to about one-half the thickness of the member 28 and having an offset lug 31 adapted to pass through a coacting slot 32 in a correspondingly reduced part 33 of the other member 28, as shown in Figures 4, 5 and 6. The arrangement is such that the parts may be interlocked by tilting one relative to the other so as to insert the lug 31 in slot 32, as shown in full lines in Figure 5, and then swinging the parts 28—28 into alignment with each other, as shown in dotted lines in this figure, and thus interlocking them together.

It will be understood that a similar connecting lug 31 and cooperating slot 32 is provided at the opposite ends of the members 28—28, but in reversed position, thus permitting the two connections to be made simultaneously in one tilting movement.

The parts 28—28 each having a plurality of inwardly projecting radial spokes 35—35 which are detachably connected with corresponding projections 27—27 carried on the spider 25, as for instance, by bolts 36—36.

From the above description it will now be understood that each hoe element is made up of two similar semi-circular parts interlocked together and detachably connected to a spider, as described. This construction permits the hoes to be taken off the shaft for replacement or repair without disturbing the adjacent hoes, as is usually necessary with solid cast hoes such as now generally in use. This feature is especially advantageous since the hoe teeth 29 are often broken, and owing to the difficulty of disassembling the present form of hoes for repair, many farmers prefer to let the hoes go without repairing or replacement for some time, accordingly diminishing the efficiency of the implement. With my improved construction, replacements are so much simpler that there is little difficulty in keeping the implement to its fullest efficiency.

I also have found that the two piece hoe member is more economical to manufacture than the single piece, due to the simpler and semi-circular form of the casting, and the consequent elimination of cracking and warping which is often encountered in a full circular form of hoe as at present in use. With an open ended, semi-circular casting of my improved form the casting may expand or contract slightly during cooling and thus be relieved of internal strains, in a manner which is not possible with a full circular casting of the usual type. Accordingly, I find that the casting losses are far less with my improved semi-circular form than with the older form of hoe.

Although I have shown and described one particular embodiment of my invention, it will be understood that I do not wish to be limited to the exact construction shown and described, but that various changes and modifications may be made without departing from the spirit and scope of my invention.

I claim as my invention:

1. A rotary hoe element comprising a hub having radial spokes, and a plurality of arcuate tooth carrying members detachably connectible to said spokes independently of each other and having interlocking mutually supporting connection with each other at adjacent ends.

2. A rotary hoe element comprising a hub having radial spokes, a plurality of arcuate tooth-carrying members detachably connectible independently of each other to the ends of said spokes and having interlocking tongue and slot connection with each other at adjacent ends.

3. A rotary hoe element comprising a hub having radial spokes, a pair of similar semi-circular tooth-carrying members detachably connectible to the ends of said spokes independently of each other, and provided with mutually interlocking tongue and slot connections at adjacent ends.

4. A rotary hoe element comprising a hub, a pair of similar semi-circular tooth-carrying members detachably connectible to said hub independently of each other and provided with mutually interlocking tongue and slot connections at adjacent ends including offset tongues insertable in their respective slots by tilting one of said members relative to the other.

5. A rotary hoe element comprising a hub having radial spokes, a pair of similar semi-circular tooth-carrying members detachably connectible to said spokes independently of each other and provided with mutually interlocking tongue and slot connections at adjacent ends including offset tongues insertable in their respective slots by tilting one of said members relative to the other.

6. In a rotary hoe, a frame, a shaft rotatably mounted thereon, a plurality of hoe elements loosely mounted on said shaft so as to be independently rotatable thereon, and one hoe element fixed to said shaft to insure rotation thereof.

Signed at Rock Island, Ill., this 24th day of June, 1929.

LEE H. KAUPKE.